J. A. FINNEY.
Insect-Destroyers.
No. 140,818. Patented July 15, 1873.
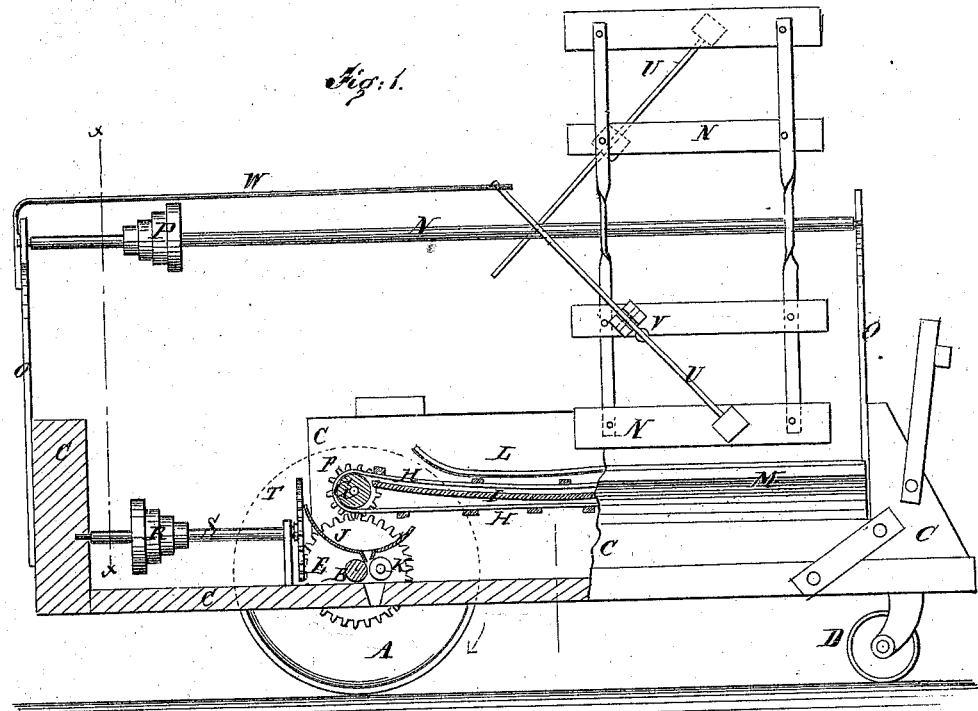
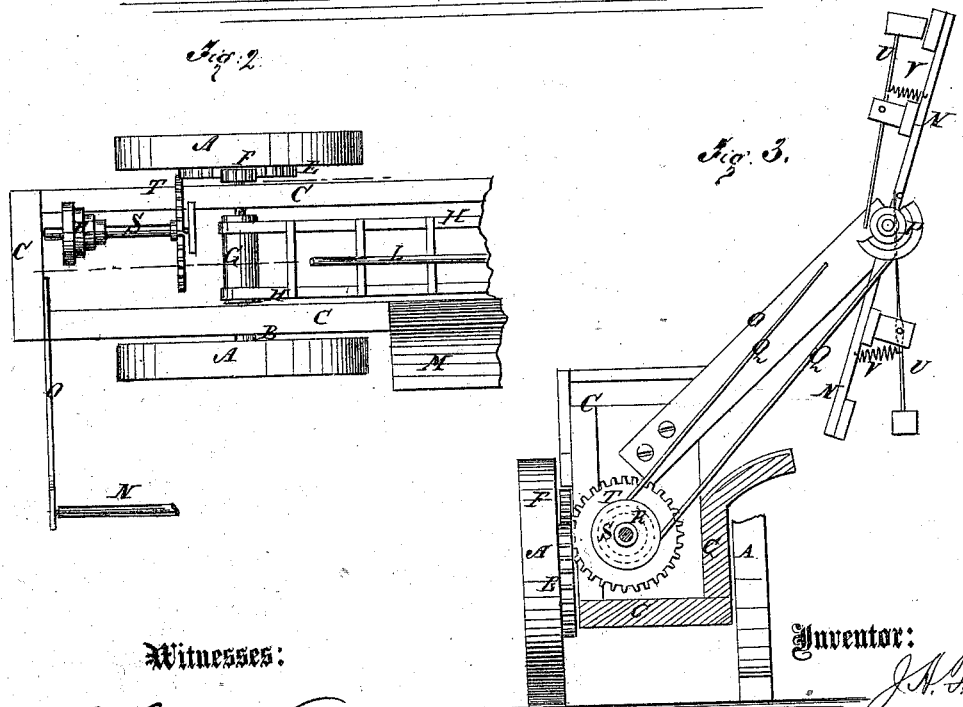
Witnesses:
Inventor:
J. A. Finney
per
Attorneys.

UNITED STATES PATENT OFFICE.

JOHN A. FINNEY, OF NASHVILLE, OHIO.

IMPROVEMENT IN INSECT-DESTROYERS.

Specification forming part of Letters Patent No. 140,818, dated July 15, 1873; application filed September 21, 1872.

*To all whom it may concern:*

Be it known that I, JOHN A. FINNEY, of Nashville, in the county of Holmes and State of Ohio, have invented a new and useful Improvement in Insect-Destroyer, of which the following is a specification:

Figure 1 is a side view of my improved machine partly in section to show the construction. Fig. 2 is a top view of the rear part of the same. Fig. 3 is a detail vertical cross-section of the same taken through the line *x x*, Fig. 1.

Similar letters of reference indicate corresponding parts.

The invention consists in the improvement of insect-traps, as hereinafter fully described and pointed out in the claim.

A are the drive-wheels, which are rigidly attached to the ends of the axle B, so as to carry said axle with them in their revolution. The axle B revolves in bearings in the box C near its rear end. The forward end of the machine may be supported by a caster-wheel, D. To the wheel C or axle B is attached a gear-wheel, E, the teeth of which mesh into the teeth of a small gear-wheel, F, attached to the end of the journal of the roller G, around which the endless belt H passes. The belt H also passes around a similar roller pivoted in the forward end of the box C. The belt H is provided with cross-bars to carry the insects forward. The belt H may be a close belt, in which case the insects are carried forward upon the belt itself; or the belt H may be an open belt, in which case a platform, I, must be placed beneath the upper part of the said belt, along which the insects are swept by the cross-bars of the belt. From the belt H, or from the end of the platform I, the insects drop into the hopper J, placed beneath the roller G, to receive them, and which has a slot or opening in its bottom, through which the insects drop into the angle between the revolving axle B and the roller K, where they are crushed and drop through an opening in the bottom of the box C to the ground. The upper part of the endless apron H, when made open, is held down closely upon the platform I by a spring-guard, L, attached to the box C. The upper side of the forward part of one of the sides of the box C is cut away, and replaced by an inclined apron, M, so arranged as to receive the insects as they are knocked from the plants and guide them to the endless apron H. N is a reel, the shaft of which revolves in bearings in arms O, attached to the ends of the box C. The arms O should be adjustable so that the reel may be adjusted as circumstances may require. To the shaft of the reel N is attached a cone-pulley, P, around which passes a belt, Q, which also passes around a cone-pulley, R, attached to the shaft S, one end of which revolves in bearings attached to the end of the box C, and its other end revolves in a support attached to the bottom of said box C. To the inner end of the shaft S is attached a gear-wheel, T, the teeth of which mesh into the teeth of the gear-wheel E, so that the reel may be operated by the advance of the machine.

By shifting the belt upon the cone-pulleys P R, the reel N may be made to revolve faster or slower, as may be desired. In case the plants are tender, the reel N may be revolved slowly, and the insects knocked off by giving the reel-arm a sharp jar as it comes in contact with said plants. This jar is given by the hammers U, the handles of which are pivoted to the said arms, and the heads of which are held against said arms by coiled springs V, as shown in Figs. 1 and 3.

W is a stop-bar, attached to one of the arms O in such a position that the ends of the hammer-handles may strike against it to raise the hammer-heads away from the reel-arms. As the reel-arms come in contact with the plants, the ends of the hammer-handles slip from the stop-bar W, and the hammer-heads are drawn by the springs V against the reel-arms with a sudden blow, knocking the insects from the plants upon the inclined apron M and endless apron H.

Having thus described my invention, I claim as new and desire to secure by Letters Patent—

1. The carrier-belt H provided with cross-bars, the platform I, and the bottom-slotted hopper J, combined with roller K and axle B, as and for the purpose described.

2. The combination, with endless apron H and platform I, of the spring-guard L, arranged as and for the purpose described.

3. The combination of the spring-hammers U V and stop-bar W, with the reel N, substantially as herein shown and described, and for the purpose set forth.

JOHN A. FINNEY.

Witnesses:
THOMAS ALLISON,
DAVID FINNEY.